United States Patent
Jung

(10) Patent No.: US 10,155,497 B2
(45) Date of Patent: Dec. 18, 2018

(54) INFLATOR, AIRBAG MODULE AND VEHICLE SAFETY SYSTEM

(71) Applicant: TRW AIRBAG SYSTEMS GMBH, Aschau am Inn (DE)

(72) Inventor: Christian Jung, Muhldorf (DE)

(73) Assignee: TRW AIRBAG SYSTEMS GmbH (DE)

( * ) Notice: Subject to any disclaimer, the term of this patent is extended or adjusted under 35 U.S.C. 154(b) by 53 days.

(21) Appl. No.: 14/953,690

(22) Filed: Nov. 30, 2015

(65) Prior Publication Data

US 2017/0158162 A1 Jun. 8, 2017

(30) Foreign Application Priority Data

Dec. 17, 2014 (DE) .................. 10 2014 018 603

(51) Int. Cl.
| | |
|---|---|
| *B60R 21/264* | (2006.01) |
| *B60R 21/272* | (2006.01) |
| *C06D 5/08* | (2006.01) |
| *B60R 21/26* | (2011.01) |

(52) U.S. Cl.
CPC .......... *B60R 21/264* (2013.01); *B60R 21/272* (2013.01); *C06D 5/08* (2013.01); *B60R 2021/26029* (2013.01)

(58) Field of Classification Search
CPC .......... B60R 21/268; B60R 2021/2685; B60R 21/264; B60R 2021/26029; B60R 2021/2642; B60R 2021/2648
See application file for complete search history.

(56) References Cited

U.S. PATENT DOCUMENTS

| | | | | |
|---|---|---|---|---|
| RE37,843 E | * | 9/2002 | Blumenthal | .......... B60R 21/017 222/3 |
| 2006/0290108 A1 | * | 12/2006 | O'Loughlin | .......... B60R 21/264 280/728.1 |
| 2013/0199399 A1 | * | 8/2013 | Young | .................. F42B 3/04 102/530 |

FOREIGN PATENT DOCUMENTS

| | | |
|---|---|---|
| DE | 29811415 | 12/1998 |
| DE | 102008022749 | 11/2009 |
| DE | 102006027048 | 12/2009 |
| DE | 102011009309 | 7/2012 |

* cited by examiner

*Primary Examiner* — James A English
(74) *Attorney, Agent, or Firm* — Tarolli, Sundheim, Covell & Tummino LLP

(57) ABSTRACT

An inflator (10), especially for a vehicle safety system, includes a combustion chamber (16) in which a solid propellant (18) combustible under the generation of gas is accommodated, and a compressed gas chamber (24) containing compressed gas (26), wherein even in the non-activated state of the inflator (10) a fluid communication exists between the combustion chamber (16) and the compressed gas chamber (24). The compressed gas (26) contains at least one inert gas as well as oxygen and at least one combustible gas, wherein the combustible gas is provided at a concentration at which no self-supporting conversion of the combustible gas with oxygen takes place.

18 Claims, 2 Drawing Sheets

INFLATOR, AIRBAG MODULE AND VEHICLE SAFETY SYSTEM

RELATED APPLICATION

This application claims priority from German Application No. 10,2014,018 603.2, filed Dec. 17, 2014, the subject matter of which is incorporated herein by reference in its entirety.

BACKGROUND OF THE INVENTION

The invention relates to an inflator comprising a combustion chamber in which a solid propellant combustible under generation of gas is accommodated and a compressed gas chamber containing compressed gas, wherein a fluid communication exists between the combustion chamber and the compressed gas chamber even in the non-activated state of the inflator. The inflator can be used especially in a vehicle safety system, for example in connection with an airbag or a belt tensioner. Apart from that, the invention relates to an airbag module and a vehicle safety system.

For providing the desired amount of gas by an inflator plural concepts are known. It is one possibility to generate the entire amount of gas from a gaseous or fluid propellant already received in a container of the inflator during manufacture, which propellant is adapted to undergo a chemical reaction upon activation of the inflator. So it is described for example in DE 10 2008 027 048 A1 to fill a compressed gas tank of the inflator with a combustible gas mixture which is ignited by an igniter upon activation of the inflator and which supplies the desired gas volume during its combustion. The gas mixture used can be, for example, hydrogen and oxygen in a combustible mixture.

It is another possibility to provide, in addition to a pressure tank containing pressurized gas, a certain amount of a solid propellant equally contributing to the gas generation in the inflator. For such hybrid inflators different gases and gas mixtures may be used, as is described e.g. in DE 10 2008 022 749 A1. In order to reduce the flow velocity and the temperature of the discharging gas an aerogel is added so that also very light gas such as helium or hydrogen can be employed.

From DE 298 11 415 U1 it is known to provide, apart from the solid propellant, liquid gas in the inflator which is converted upon activation of the inflator under generation of gas.

When a combustible gas mixture or a combustible liquid is used, the amount of gas generated but also the temperature of the discharging gas is increased.

Another option of gas generation as described in the generic DE 10 2011 009 309 A1, for example, consists in the use of an inert gas as compressed gas, such as argon or helium, along with a solid propellant in the form of tablets, with the compressed gas surrounding also the propellant tablets.

SUMMARY OF THE INVENTION

It is the object of the invention to provide a generic inflator having an enhanced output.

Moreover, it is the object of the invention to describe an airbag module and a vehicle safety system comprising a further developed inflator.

According to the invention, the object is achieved with respect to the inflator by the subject matter of claim 1, with respect to the airbag module by the subject matter of claim 11 and with respect to the vehicle safety system by the subject matter of claim 12.

In accordance with the invention, this is achieved by an inflator, especially for a vehicle safety system, comprising a combustion chamber in which a solid propellant combustible under generation of gas is accommodated and a compressed gas chamber containing compressed gas, wherein even in the non-activated state of the inflator a fluid communication exists between the combustion chamber and the compressed gas chamber. The compressed gas contains at least one inert gas as well as oxygen and at least one combustible gas, the combustible gas being provided at a concentration at which no self-supporting conversion of the combustible gas with oxygen takes place.

With an exclusive use of inert gases the igniter has to act thermally against the cold inert gas which delays igniting and the gas release from the solid propellant. It has turned out that by the thermal conversion of the combustible gas contained in the compressed gas according to the invention the compressed gas can be sufficiently heated so as to facilitate ignition of the solid propellant and to accelerate gas generation. Accordingly, the heat generated by the conversion of the combustible gas with oxygen supports the igniter in terms of energy and, respectively, the released igniting gases and/or igniting particles and the already ignited hot propellant particles for the ignition of propellant not ignited so far.

Applicant found that it is sufficient for achieving the energetically assisting heating action, when at room temperature and at the pressure prevailing before activation of the inflator in the compressed gas chamber the concentration of the combustible gas in the compressed gas is subcritical, i.e. in the activated state of the inflator the conversion of the combustible gas with oxygen has to be supported and maintained by the heat generated by the igniter or the conversion of the solid propellant and for the conversion with oxygen the combustible gas constantly requires thermal activating energy from an external source. The discharging gas is not heated to an undesired degree by the conversion of the combustible gas.

Preferably the inert gas is selected from the group consisting of argon, nitrogen, helium and the mixtures of at least two of said gases at a time, wherein also other gases not reacting with the combustible gas and oxygen are considered, however.

Prior to activating the inflator the compressed gas is pressurized at about 50 to 75 MPa, for example.

The combustible gas may be selected from the group consisting of hydrogen, methane, ethane, propane and the mixtures of at least two of said gases at a time, with the use of hydrogen being preferred. Apart from said gases, also other combustible gases come into consideration.

In order to obtain, even with the provided low concentrations of the combustible gas, the at least largely complete conversion of the same, the combustible gas is provided proportional to oxygen preferably sub-stoichiometrically, wherein definitely more oxygen is provided in the compressed gas than it would be required for the complete conversion of the combustible gas.

For example, the oxygen may be provided at a portion of 10 to 30 mole %, especially of 15 to 25 mole % in the compressed gas, related to the entire amount of substance in the compressed gas.

Preferably the combustible gas, especially hydrogen, is provided at a portion of 2.5 to 4.0 mole %, in particular of 2.5 to 3.5 mole % in the compressed gas.

Accordingly, the inert gas is preferably provided at a portion of approx. 66 to 87.5 mole % in the compressed gas.

A gas mixture preferred according to the invention comprises argon at a portion of 65 to 75 mole %, oxygen at a portion of 10 to 30 mole %, preferably 15 to 25 mole % and further preferred 15 to 20 mole %s as well as hydrogen at a portion of 2.5 to 4 mole %, preferably 2.5 to 3.5 mole % and further preferred 2.5 to 3 mole %, each related to the entire amount of substance of the gas mixture. Up to 10 % of the argon portion may be replaced with helium.

It turned out that with said concentrations a good thermal assistance is achieved by the combustible gas without a self-supporting conversion of the combustible gas taking place.

Prior to activation of the inflator, in the combustion chamber preferably the same pressure is prevailing as in the compressed gas chamber, thus offering the advantages that a separation between the combustion chamber and the compressed gas chamber need not be made in a gas-tight manner and that the space between the propellant tablets in the combustion chamber can be used for storing compressed gas.

However, the igniter is preferably sealed in a gas-tight manner against the combustion chamber and/or the compressed gas so as to ensure rapid ignition of the solid propellant.

The inflator is preferably designed as shock wave generator, wherein between the combustion chamber and the compressed gas chamber a burst membrane is arranged for generating a shock wave in the compressed gas in the compressed gas chamber.

It is known that for generating a shock wave no gas-tight separation is required between the combustion chamber and the compressed gas chamber, but overflow orifices allowing a pressure compensation between the compressed gas chamber and the combustion chamber should be selected to have only such size that the combustible solid propellant can destroy the burst membrane by its gas generation and can generate a sufficiently strong shock wave in the compressed gas chamber.

Preferably, solid propellants based on guanidine compounds, especially guanidine nitrate, are used.

As regards an airbag module, the object is achieved by the features of claim 11. Such airbag module according to the invention may comprise an inflator according to the invention.

As regards a vehicle safety system, the object is achieved by the features of claim 12. Accordingly, a vehicle safety system includes an inflator according to the invention and/or an airbag module according to the invention.

BRIEF DESCRIPTION OF THE DRAWINGS

Hereinafter the invention shall be described in detail by way of an embodiment with reference to the enclosed figures in which.

DESCRIPTION

Figure 1:
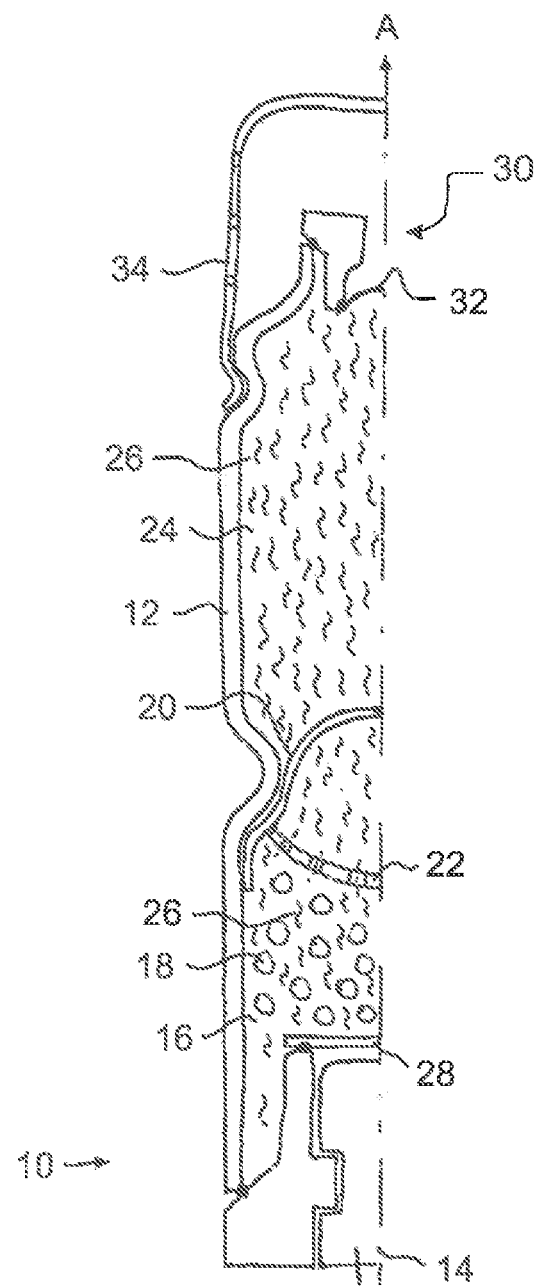
FIG. 1 shows a schematic sectional view of an inflator according to the invention.

In FIG. 1 an inflator 10 is shown which is in the form of a tubular inflator having an elongate and substantially cylindrical housing 12. An igniter 14 adapted to be electrically activated is arranged at an axial end of the inflator 10.

In the housing 12 a combustion chamber 16 is provided which is filled with a solid propellant 18 in the form of tablets, in this case on the basis of guanidine nitrate. A burst membrane 20 is provided at an axial end of the combustion chamber 16 facing away from the igniter 14.

In the combustion chamber 16 a screen 22 serving for withholding particles which are formed during combustion of the solid propellant 18 may be arranged ahead of the burst membrane 20.

In the axial direction A, a compressed gas chamber 24 is connected to the combustion chamber 16 filled with a compressed gas 26 which in this case (prior to the activation of the inflator 10) is pressurized at approx. 50 to 75 MPa.

The burst membrane 20 is inserted in the housing 12 so that a flow communication exists for the compressed gas 26 between the compressed gas chamber 24 and the combustion chamber 16 and in both chambers the same pressure is prevailing. The tablets of the solid propellant 18 are surrounded by compressed gas 26. In order to permit pressure compensation between the combustion chamber 16 and the compressed gas chamber 24, for example at the periphery of the burst membrane 20 plural narrow overflow passages may be provided for forming overflow orifices between the combustion chamber and the compressed gas chamber (not shown).

The igniter 14 is appropriately separated in a gas-tight manner, for example by a protective film 28, from the combustion chamber 16 and thus from the compressed gas 26, too.

The end 30 of the compressed gas chamber 24 facing away from the igniter 14 in the axial direction A is closed by a second burst membrane 32 which seals the housing from the environment in a gas-tight manner. Said axial end 30 is surrounded by a diffusor 34 which diverts discharging gas which serves, for example, for filling an airbag (not shown) into the desired direction.

The compressed gas 26 largely consists of an inert gas which in this case is selected from the group consisting of argon, nitrogen, helium and the mixtures thereof. The inert gas portion amounts to about 66.0 to 87.5 mole % of the entire compressed gas, for example. In addition to the inert gas, the compressed gas contains oxygen, for instance at a portion of 10 to 30 mole % and especially of 15 to 25 mole %. Moreover the compressed gas 26 contains a combustible gas, however at a concentration at which no self-supporting conversion of the combustible gas with the oxygen contained in the compressed gas 26 can take place, when the inflator 10 is activated. The combustible gas in this case is selected from the group consisting of hydrogen, methane, ethane, propane and the mixtures thereof. Hydrogen is especially preferred as the combustible gas. The combustible gas, in this case hydrogen, is provided at a portion of 2.5 to 4.0 mole % and especially of 2.5 to 3.5 mole % in the compressed gas 26 (related to the entire amount of substance in each case).

Upon activation of the inflator 10, the igniter 14 is electrically activated and upon bursting of the protective film 28 supplies thermal energy, especially in the form of hot particles and/or hot gases, for starting combustion of the solid propellant 18. As the latter is surrounded by compressed gas 26, part of the thermal energy released by the igniter is dissipated by the compressed gas 26. This loss of energy is compensated at least by the fact, however, that the combustible gas reacts with the oxygen contained in the compressed gas. The thermal energy being released during said conversion supports the thermal ignition and the disintegration of the solid propellant 18. The concentration of the combustible gas in the compressed gas 26 is selected to be so low, however, that it cannot react in a self-supporting manner but for its conversion constantly requires the thermal energy generated by the solid propellant 18 and, resp., by the igniter 14.

The overflow passages (not shown) at the burst membrane 20 are formed so that only a small portion of gas at higher pressure overflows from the combustion chamber 16 into the compressed gas chamber 24, which is insignificant to the discharge behavior of the inflator 10.

When a predetermined pressure level is exceeded by the generation of gas from the solid propellant 18 in the combustion chamber 16, the burst membrane 20 suddenly bursts. The sudden opening of the burst membrane 20 generates a shock wave passing through the compressed gas chamber 24 in the axial direction A and impinges on the second burst membrane 32 and opens the latter. Thus the gas can discharge from the inflator 10 through the openings in the diffusor 34.

When the compressed gas 26 discharges from the inflator 10, the concentration of the combustible gas is reduced so strongly that no further reaction of combustible gas which has not yet been converted with atmospheric oxygen takes place.

Figure 2:
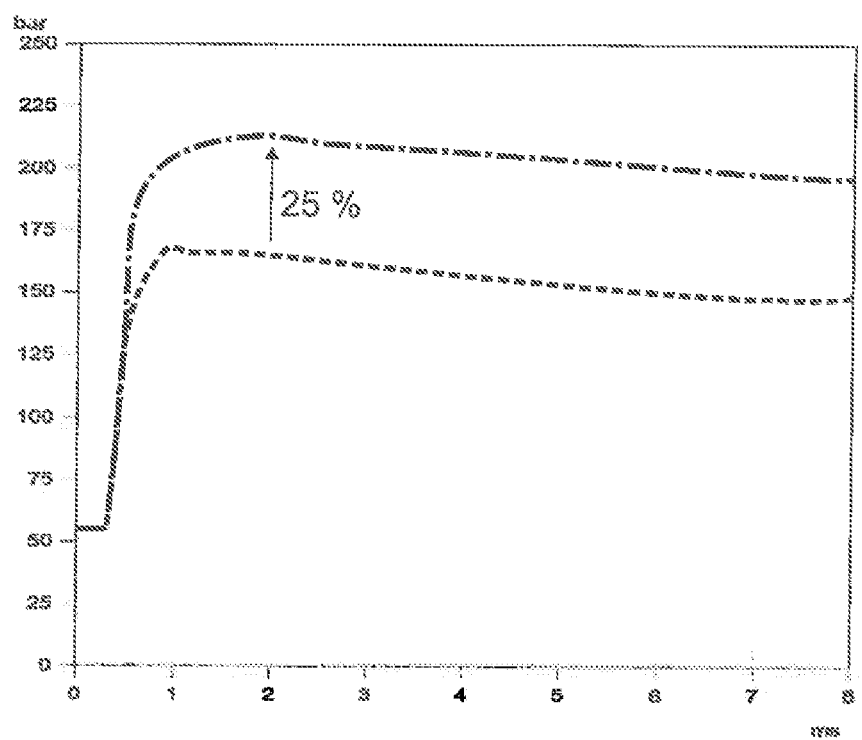
FIG. 2 shows a diagrammatic view of a can test including different gas mixtures.

FIG. 2 illustrates a so called can test including two different gas mixtures under otherwise identical conditions. The can used here is a predefined volume in which a particular, especially physical-chemical, reaction is measured.

Each of the gas mixtures was introduced into a closed can by a conventional igniter and after igniting the igniter the generation of pressure in the can was measured.

The initial pressure in both cases was 55 bar (5.5 MPa).

The broken graph illustrates the generation of pressure when using a conventional gas mixture of 94.1 % Ar, 3 % He and 2.9 % $H_2$, without oxygen. The dot-dash graph, on the other hand, shows the generation of pressure with a gas mixture of 92.5 % Ar, 3 % He, 2.6 % $H_2$ and 1.8 % $O_2$ (all indications made in percentage by volume). In this test, a definite increase in the pressure maximum in the can by approx. 25 % is evident compared to the first conventional gas mixture.

The invention claimed is:

1. An inflator for a vehicle safety system, comprising a combustion chamber (16) accommodating a solid propellant (18) and a compressed gas chamber (24) containing a compressed gas (26), wherein fluid communication exists between the combustion chamber (16) and the compressed gas chamber (24) so that the compressed gas (26) is also contained in the combustion chamber (16) with the solid propellant (18), wherein the compressed gas (26) contains at least one inert gas as well as oxygen and at least one combustible gas, wherein the combustible gas is provided at a concentration at which no self-supporting conversion of the combustible gas with oxygen takes place.

2. The inflator according to claim 1, wherein the combustible gas is provided proportional to oxygen in a substoichiometric manner so that there is a higher concentration of oxygen in the compressed gas (26) than would be necessary for the complete conversion of the combustible gas.

3. The inflator according to claim 1, wherein the oxygen is provided at a portion of 10 to 30 mole % in the compressed gas (26).

4. The inflator according to claim 1, wherein the combustible gas is selected from the group consisting of hydrogen, methane, ethane, propane and a mixture of at least two of said gases at a time.

5. The inflator according to claim 1, wherein the combustible gas is hydrogen.

6. The inflator according to claim 4, wherein the combustible gas makes up 2.5 to 4.0 mole % of the compressed gas (26).

7. The inflator according to claim 1, wherein the inert gas makes up 66.0 to 87.5 mole % of the compressed gas (26).

8. The inflator according to claim 1, wherein the inert gas is selected from the group consisting of argon, nitrogen, helium and a mixture of at least two of said gases at a time.

9. The inflator according to claim 1, wherein the compressed gas (26) is pressurized at about 50 to 75 MPa prior to the activation of the inflator (10), and wherein prior to the activation of the inflator (10), in the combustion chamber (16) the same pressure is prevailing as in the compressed gas chamber (24).

10. The inflator according to claim 1, wherein an igniter (14) is sealed in a gas-tight manner against the compressed gas (26) and wherein between the combustion chamber (16) and the compressed gas chamber (24) a burst membrane (20) is arranged for generating a shock wave in the compressed gas chamber (24).

11. An airbag module comprising an inflator according to claim 1.

12. A vehicle safety system comprising at least one of an inflator and an airbag module according to claim 1.

13. The inflator according to claim 5, wherein the combustible gas makes up 2.5 to 4.0 mole % of the compressed gas (26).

14. The inflator according to claim 1, wherein the oxygen is provided at a portion of 15 to 25 mole % in the compressed gas (26).

15. The inflator according to claim 1, wherein the concentration of the combustible gas in the compressed gas (26) is subcritical so that the conversion of the combustible gas with the oxygen requires constant thermal activating energy from at least one of an igniter (14) and a combustion of the solid propellant (18).

16. The inflator according to claim 15, wherein the igniter (14) provides thermal activating energy for initiating the combustion of the solid propellant (18), and thermal energy generated from the conversion of the combustible gas with oxygen is required to support the combustion and disintegration of the solid propellant (18).

17. The inflator according to claim 15, wherein the thermal activating energy provided by the igniter (14) is at least partially dissipated by the compressed gas (26), and the thermal energy generated by the conversion of the combustible gas with the oxygen at least partially compensates for the dissipated thermal activating energy.

18. The inflator according to claim 1, wherein the solid propellant (18) comprises guanidine nitrate.

* * * * *

UNITED STATES PATENT AND TRADEMARK OFFICE
CERTIFICATE OF CORRECTION

PATENT NO. : 10,155,497 B2
APPLICATION NO. : 14/953690
DATED : December 18, 2018
INVENTOR(S) : Christian Jung Page 1 of 1

It is certified that error appears in the above-identified patent and that said Letters Patent is hereby corrected as shown below:

In the Claims

Column 6, Line 11 Claim 6, reads "up2.5" should read --up 2.5--

Signed and Sealed this
Twenty-ninth Day of January, 2019

Andrei Iancu
*Director of the United States Patent and Trademark Office*